Patented May 30, 1950

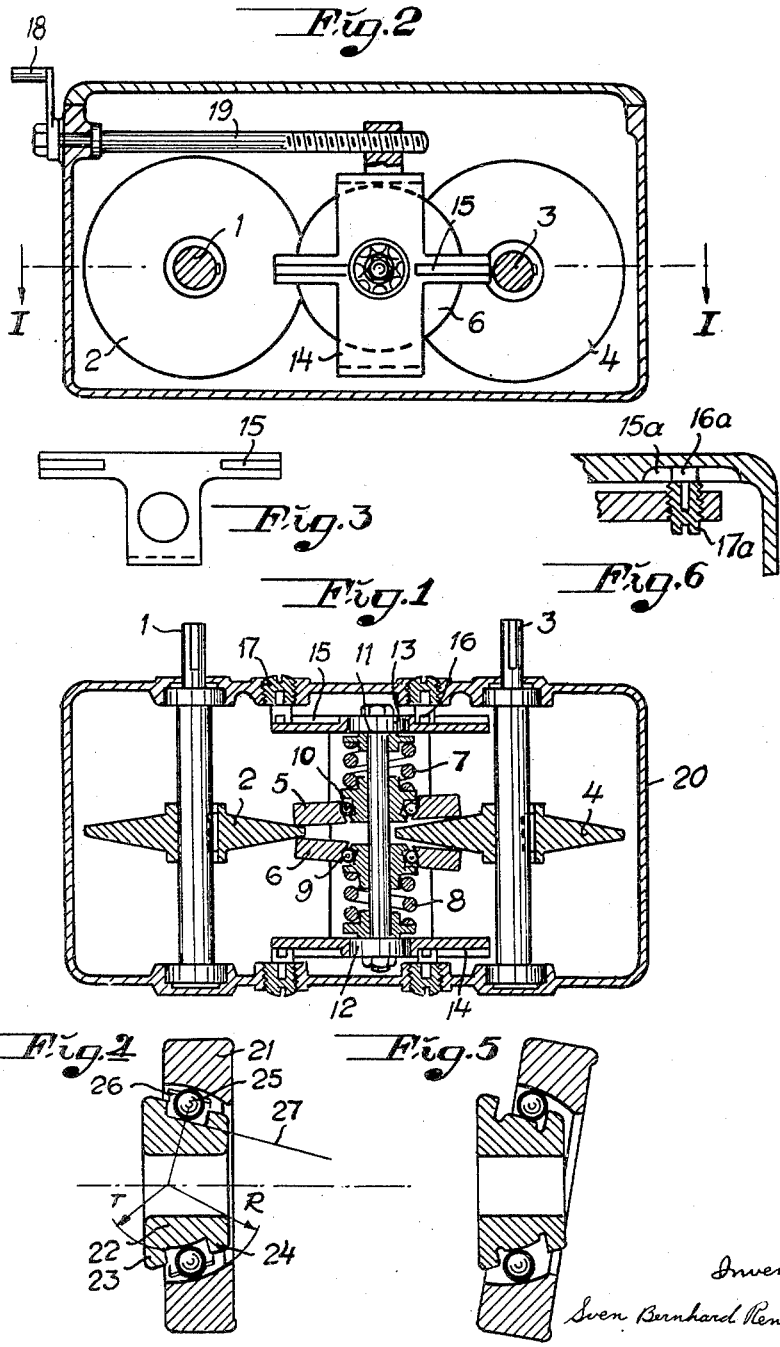

2,509,940

UNITED STATES PATENT OFFICE 2,509,940

VARIABLE SPEED CHANGING GEAR

Sven Bernhard Rennerfelt, Goteborg, Sweden

Application December 4, 1946, Serial No. 713,993
In Sweden May 24, 1946

6 Claims. (Cl. 74—199)

The present invention relates to a variable speed changing gear of the type in which two friction discs located substantially in a common plane and secured to separate shafts and having a thickness decreasing towards the periphery cooperate with two friction wheels which are forcibly pressed against the friction discs and are rockably mounted on a gear shaft displaceable between said separate shafts. The object of the invention is to provide an improved construction which avoids certain inconveniences inherent to known devices of the type in consideration.

I attain this object by mechanism illustrated in the accompanying drawing, in which—

Fig. 1 is a horizontal section taken on line I—I, Fig. 2, of a variable speed changing gear according to the invention; Fig. 2 is a vertical section of the gear; Fig. 3 shows a modified construction of a frame for the mounting of the gear shaft; Fig. 4 is a central section of a self-aligning bearing; Fig. 5 is a similar section showing the bearing in another position; and Fig. 6 is a section through part of the casing and frame and illustrates a modified construction for mounting the frame in the casing.

Referring to Figs. 1 and 2, reference numeral 1 denotes the driving or primary shaft of the speed changing gear, said shaft having keyed onto it a friction disc 2. A similar friction disc 4 is keyed onto the secondary or driven shaft 3. As will be seen from Fig. 1, the shafts 1 and 3 are mounted in ball bearings in parallel relation, the discs 2 and 4 being located substantially in a common plane at right angles to the axes of the shafts. Between the shafts 1 and 3, there are provided two friction wheels 5 and 6 which by means of strong springs 7 and 8, respectively, are forcibly pressed against the discs 2 and 4. Because of the varying thickness of the discs 2 and 4, the friction wheels 5 and 6 are rockably mounted by means of bearings 10 and 9, respectively, said bearings permitting the wheels of adjusting themselves in different angular positions with respect to the gear shaft 11. The springs 7 and 8 are placed around the gear shaft 11 which by means of bearings 12 and 13 is mounted in a frame 14 displaceable relative to the shafts 1 and 3. The frame 14 is guided by means of grooves 15 which receive studs, rolls or wedges 16 secured to the casing 20 which surrounds the speed changing gear. The studs 16 are mounted in screws 17 for exact adjustment. By means of a crank 18 and a screw 19, the frame 14 together with the gear shaft 11 and the friction wheels 5 and 6 can be displaced relative to the shafts 1 and 3 so as to vary the gear ratio.

As will appear from Fig. 6, the studs 16 may be replaced by rolls 16a running in grooves 15a provided in the casing, said rolls being mounted in screws 17a threaded into the frame.

In the form of construction of the frame illustrated in Fig. 3, the grooves 15 for the studs 16 are provided in arms located above the shafts 1, 3 and 11. Due to this construction, the studs can be disposed at a greater distance from each other with the result that the frame is more easily displaceable and that the assemblage of the speed changing gear is facilitated.

In order to avoid the necessity of large dimensions of the friction discs, a high spring tension must be applied, and it has proved that even slight irregularities in the construction of the friction wheels will give rise to great forces upon the control device resulting in vibrations. The above described control device can be constructed as a light and yet rigid system capable of withstanding large stresses.

As will appear from Fig. 4, the bearings for the friction wheels 5 and 6 comprise spherical outer races 21 and spherical inner races 22 directly mounted on the gear shaft 11. The radius R of the spherical race of each outer ring has the same center as the radius r of the spherical race of the inner ring. One of said rings should be provided with lateral flanges. In the embodiment shown, the inner ring has two lateral flanges 23 and 24 spaced from each other at a distance greater than the diameters of the balls 25 of the bearing, said flanges limiting the axial movement of the balls. A ball cage 26 is provided for retaining the balls when the bearing is to be dismounted.

In the embodiment shown in Figs. 1 and 2, the friction wheels 5 and 6 constitute the outer rings of the self-aligning bearings.

Upon displacement of the gear shaft 11 from its intermediate or central position, the friction wheels 5 and 6 will take oblique positions in accordance with the conical faces of the friction discs 2 and 4. Due to the high tension of the springs upon the bearings 9 and 10, a considerable amount of friction will occur in said bearings. Further, in the oblique positions of the wheels, the balls will be located at different distances from the gear shaft. As a result thereof, the gear shaft will rotate in the ball bearings 12 and 13 which are subject to minor forces. Upon their rotation, the friction wheels 5 and 6 will rock relative to the gear shaft, but will rotate about said shaft to a minor extent only. Consequently, the balls 25 of the self-aligning bearings 9 and 10 will make small movements only so as not to be subject to great stresses due to fatigue. As a result the balls can be subject to high pressures and will yet be durable for a long period of time. The flanges 23 and 24 limit the axial movement of the balls so as to avoid fracture of the ball cage. Should the balls at the assembly of the bearing in the intermediate position of the gear shaft not be located midway between the flanges, they will, upon rocking of the friction wheels, be forced to slide to the desired positions and will thereupon make mere rolling movements so as to eliminate wear.

If the outer ring of the self-aligning bearing is designed for a minor angular displacement, the inner ring may be provided with a conical racing face generated by the tangent 27 through the point of contact between the balls 25 and the racing face of the inner ring.

What I claim is:

1. In a variable speed changing gear, a casing member, a primary shaft and a secondary shaft journalled in said casing member in spaced parallel relation, a friction disc on each of said shafts, said discs being disposed substantially in a common plane and having a thickness decreasing toward the periphery thereof, a frame member disposed in said casing member between said shafts, means for mounting said frame member in said casing member for sliding displacement with respect to said shafts comprising oppositely disposed parallel grooves in one of said members and axially adjustable projecting studs carried by the other engaging said grooves, a gear shaft journalled in said frame member in parallel relation to said primary and secondary shafts, two friction wheels rockably mounted on said gear shaft in engagement with the lateral faces of said friction discs on said primary and secondary shafts and resilient means for forcing said wheels against said discs.

2. In a variable speed changing gear, a casing, a primary shaft and a secondary shaft journalled in said casing in spaced parallel relation, a friction disc on each of said shafts, said discs being disposed substantially in a common plane and having a thickness decreasing toward the periphery thereof, a frame displaceably mounted in said casing between said primary and secondary shafts, a gear shaft journalled in said frame in parallel relation to said primary and secondary shafts, two self-aligning ball bearings on said gear shaft each comprising an inner race the surfaces of which taper in the direction of each other and an outer race the surfaces of which taper in a direction away from each other, two friction wheels respectively rigidly mounted on the outer race of said ball bearings and engaging the lateral faces of the friction discs on said primary and secondary shafts and resilient means biasing said inner races of said bearings toward each other for forcing said friction wheels against said discs.

3. A variable speed gearing according to claim 2 in which each of said ball bearings comprises an outer spherical race and an inner spherical race.

4. A variable speed gearing according to claim 2 in which each of said ball bearings comprises an outer spherical race and an inner conical race.

5. A variable speed gearing according to claim 2 in which each of said ball bearings comprises an outer ring and an inner ring and lateral flanges on one of said rings for limiting the axial movement of the balls of the bearing.

6. A variable speed gearing according to claim 2 in which lateral flanges are provided on one of said races for limiting the axial movement of the balls of the bearing, said outer races being formed as an integral part of the friction wheels in engagement with the lateral faces of said friction discs.

SVEN BERNHARD RENNERFELT.

REFERENCES CITED

The following references are of record in the file of this patent:

UNITED STATES PATENTS

| Number | Name | Date |
|---|---|---|
| 766,438 | Gardner | Aug. 2, 1904 |
| 768,574 | Rice | Aug. 23, 1904 |
| 1,336,927 | Silvius | Apr. 13, 1920 |
| 1,973,064 | Gwinn, Jr. | Sept. 11, 1934 |
| 2,259,881 | Foley | Oct. 21, 1941 |
| 2,342,946 | Le Tourneau | Feb. 29, 1944 |

FOREIGN PATENTS

| Number | Country | Date |
|---|---|---|
| 558,480 | France | May 26, 1923 |
| 204,861 | Great Britain | Oct. 11, 1923 |
| 392,917 | Great Britain | May 24, 1933 |